United States Patent [19]

Vanden Broek

[11] 4,267,574
[45] May 12, 1981

[54] DISPLAY AND PROCESSOR FOR TIME-VARYING ELECTRIC SIGNAL

[75] Inventor: Jan A. Vanden Broek, Ann Arbor, Mich.

[73] Assignee: Transidyne General Corporation, Ann Arbor, Mich.

[21] Appl. No.: 11,295

[22] Filed: Feb. 12, 1979

[51] Int. Cl.³ .............................................. G06K 1/18
[52] U.S. Cl. ..................................... 364/520; 360/37; 346/33 R
[58] Field of Search .............................. 364/415–416, 364/496–499, 200, 900, 518, 520, 579, 733; 346/13, 33 A, 33 R, 44; 235/92 DP, 92 MP; 360/36, 37

[56] References Cited

U.S. PATENT DOCUMENTS

| | | | |
|---|---|---|---|
| 3,185,820 | 5/1965 | Williams et al. | 364/498 |
| 3,601,536 | 8/1971 | Calfee | 360/37 |
| 3,767,899 | 10/1973 | Barter | 346/33 R |
| 3,784,789 | 1/1974 | Broek | 364/497 |
| 3,803,629 | 4/1974 | Walsh et al. | 346/33 R |
| 3,860,952 | 1/1975 | Tallent et al. | 360/36 |
| 3,965,477 | 6/1976 | Hambleton et al. | 346/13 |
| 3,984,662 | 10/1976 | Sorenson | 235/92 DP |
| 4,034,209 | 7/1977 | Kashio | 346/44 |
| 4,038,664 | 7/1977 | Muir | 346/33 A |

Primary Examiner—Charles E. Atkinson
Assistant Examiner—Gary Chin
Attorney, Agent, or Firm—Krass & Young

[57] ABSTRACT

A system for recording the magnitude of a time-varying electrical signal on a chart and for computing the integrals of various segments of the signal, includes operator actuated controls for providing the computer with the integration boundaries on the curve. As the signal is recorded on the chart, the value of its magnitude or its integral is also entered into a memory. To select a boundary the controls are actuated as a point on the recorded curve passes under a cursor. The computer is provided with the manually entered boundary signals and the related magnitude or integral signal at the same instant. To maintain synchronism between the stored signals provided to the computer and the boundary signals, the rate of motion of the chart is detected and used to control the rate of provision of the stored signals' values from the memory to the computer. This allows use of a low cost, variable speed chart drive.

14 Claims, 7 Drawing Figures

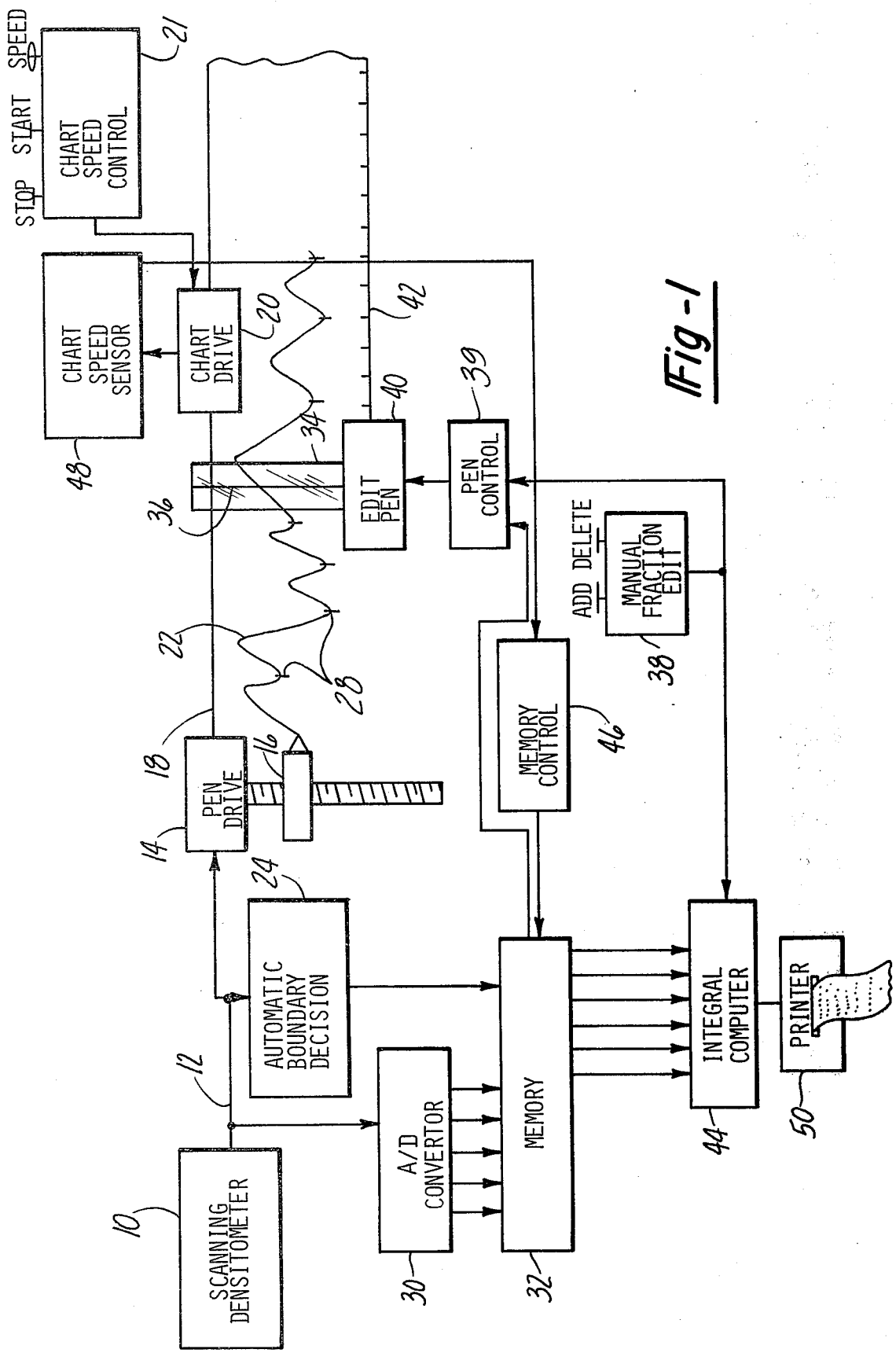

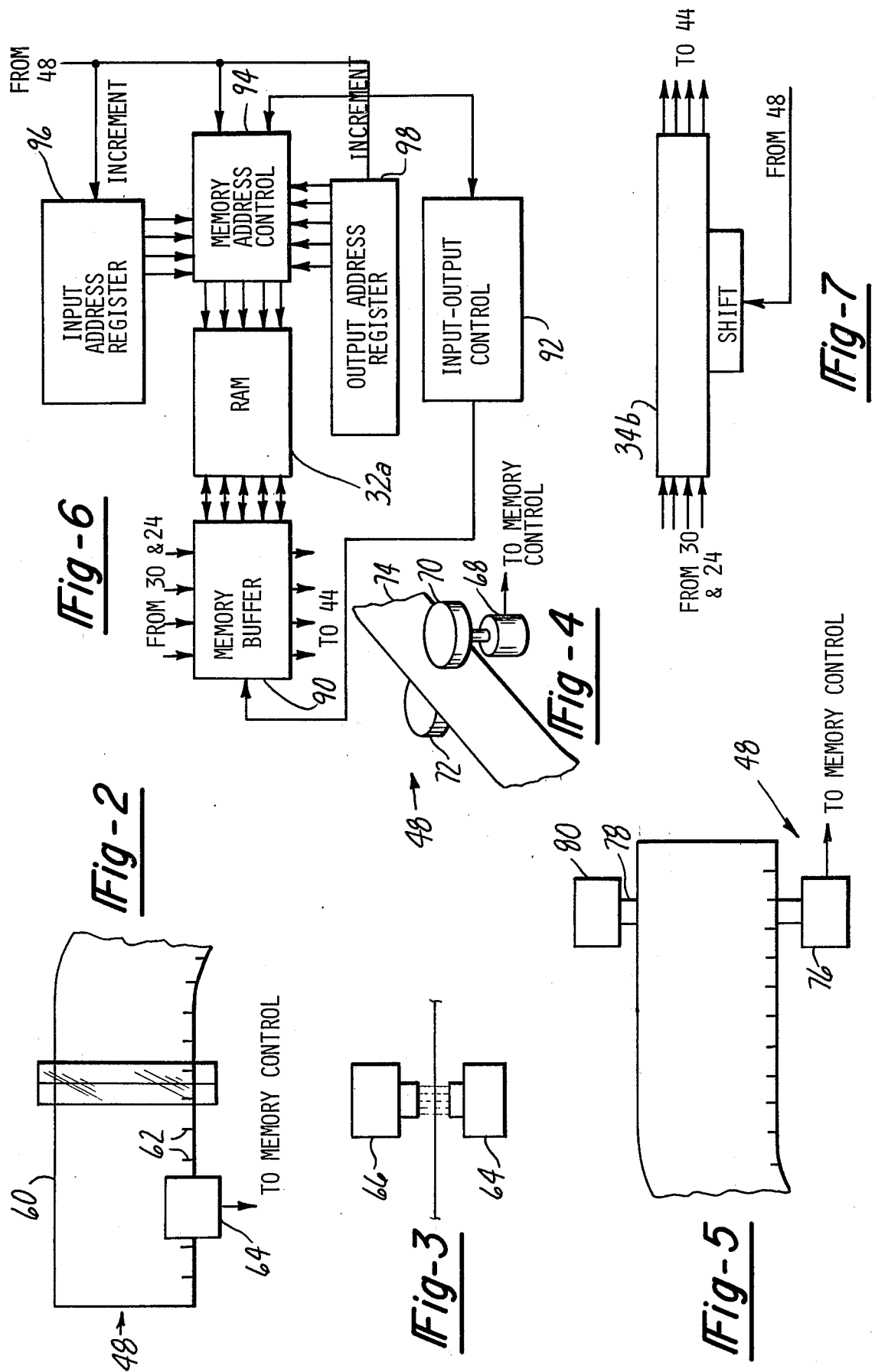

DISPLAY AND PROCESSOR FOR TIME-VARYING ELECTRIC SIGNAL

BACKGROUND OF THE INVENTION

1. Field of the Invention

This invention relates to electronic systems for displaying time varying electrical signals and computing integrals of operator controlled segments of the signals and more particularly to such a system wherein the operator may specify integration boundaries after observing a pertinent section of the display.

2. Description of the Prior Art

In certain analytic systems it is desirable to provide an operator with a display of a time varying quantity as well as with information relating to the nature of certain segments of the curve thus generated, such as the values of segment integral. For example, it is common to analyze the protein constituents of a blood sample by electrophoresis. This involves placing the sample on a media and subjecting it to an electric field which will cause the protein fractions to migrate at rates dependent upon their molecular weights. The resultant "separation" may be analyzed by optically scanning it from end to end to generate a time varying electrical signal. When this signal is recorded on a chart it will provide a graphic representation of the densities along the sample and a trained operator can identify various segments of the curve with particular protein fractions of the blood. My U.S. Pat. No. 3,784,789 disclosed a system operative to generate the visual display of the time varying signal resulting from optically scanning the separation, and to compute the values of the integrals of various segments of the curve representative of particular protein fractions. In that system the boundaries between the fractions were first automatically generated by circuits which received the time varying signal and detected reversals in the sign of the differential of the displayed value. As the instantaneous magnitude of the signal was recorded on a moving chart it was also digitized and the values entered into a shift register along with the detected fraction boundaries. A control system generated clocking signals which powered the chart drive motor and the advance of the digital signals in the shift register in timed relationship to one another. A short time after a particular point in the signal was recorded on the chart paper, sufficient to allow an operator to observe the nature of the curve, the chart paper passed under a cursor and the operator could modify an automatically generated boundary decision through use of manual controls which allowed him to either delete a previously determined boundary or add a new boundary. These editing signals, along with the output of the shift register, were then provided to the computer which generated the integral values of the edited curve segments.

The system for driving the chart in timed relation to the advance of the digital signals in the shift memory was a relatively expensive part of the system and imposed certain limitations on the operation of the system. That synchronization was accomplished by clocking the memory with a power line derived signal and by employing a line synchronous chart drive motor. Alternatively, the chart drive motor could be of a stepping type controlled by a clock common to the motor and the memory.

Motors which can provide such precise chart paper control are generally quite expensive and stepping motors require a substantial amount of controlling electronics. It was also difficult to retrofit this manual editing feature to existing instruments equipped only with the automatic detection feature because of the need for changing the drive motor. Additionally, because of the requirement for constant speed for the drive motor, the operator was unable to modify the scale factor so that interesting sections of the curve could be observed in greater detail.

The present invention is directed toward a recording and computing system of this broad type employing a novel system for controlling the chart's speed and the advance of the stored signals in the memory relative to one another which is lower in cost and more flexible in operation than the previous system.

SUMMARY OF THE INVENTION

The present invention provides a system for recording the time varying electrical signal and storing the electrical values of the signal for later computation, wherein the rate of operation of the graphic recorder controls the rate of advance of the stored signals values in the memory, or more generally controls the output of the stored signal values from the memory to the computation apparatus. This arrangement allows the graphic recorder, usually a chart recorder, to be independently controlled substantially lowering its cost and allowing the use of the variable speed recording system.

In a preferred embodiment of the invention, which is subsequently disclosed in detail, the graphic record of the output of a densitometer scanning an electrophoretic separation is recorded on a moving chart and the instantaneous amplitude of the signal or its integral is simultaneously digitized and entered into a random access memory under the control of a suitably programmed microprocessor. The chart paper drive motor is a low cost universal motor powered by a variable voltage supply to provide a variable chart speed. An operator adjusted control allows the chart speed to be raised to increase the scale factor for signal sections of particular interest or to compress the scale factor for other segments. Alternatively, a pulse generator could be driven directly by the chart paper through use of a friction wheel which engages the chart paper. These pulses are used to control a memory address register which determines the memory cell location to be outputted. The pulses are similarly used to increment the contents of a register that identifies the memory cell in which the digitized value of the signal amplitude then being recorded on the chart, or its integral, is to be stored. A cursor is positioned over the chart paper downstream of the recording pen so that a point on the curve drawn by the pen passes under the cursor a period of time after the point is written by the pen, the period depending upon the rate of operation of the chart paper drive between the time the point is written and it passes under the cursor. The chart drive produced pulses modify the contents of both memory address registers so that a digital signal from the memory is provided to the computer exactly when the point on the chart record corresponding to that digital value passed under the cursor. Automatically detected fraction boundaries generated as the curve is written on the chart paper are similarly fed into the memory and provided to the computer under the control of the memory address registers. The computer also receives operator controlled boundary delete or add signals which may be generated as a particular point on the chart passes under the cursor. For example, if the automatic boundary detector has selected a particular point on the curve as the boundary between two fractions, and has produced a mark on the chart to signify that decision and generated a boundary decision signal for entry into memory, the operator can override the automatic fraction decision by activating a delete button when the selected point passes under the cursor. He may also add a boundary decision when any other point on the curve passes under the cursor. These operator generated editing signals are provided directly to the computer and need not be stored in memory.

Since the system operation is controlled by the chart speed drive, that speed may be modified by the operator without altering the operation of the system. This also allows the operator controlled fraction boundary decision editing system to be installed on existing equipment without changing the chart drive motor to the synchronous or stepping variety.

In an alternative embodiment of the invention, markings are placed on the chart paper at regular intervals and are sensed by a transducer as the chart drive moves. This eliminates the need for coupling a transducer to the drive system and also allows the delay between the time the signal is recorded on the paper and the time that the point passes under the cursor to be modified by changing the chart paper and repositioning the cursor.

In another alternative embodiment of the invention a shift register could be substituted for the random access memory and the pulses generated in timed relation to the rate of motion of the chart drive could be used to advance the contents of the shift register. This would eliminate the need for identifying the memory cells of a random access memory from which data is to be entered and supplied to the computer.

The low cost motor used with this system and the elimination of unnecessary drive electronics substantially lowers both the initial cost and the maintenance requirements for the systems using the present invention. The present invention also contemplates the provision of an operator controlled switch which will stop the chart paper motion so that the operator may study a particular section of the curve at leisure, before it passes under the cursor and the boundary editing decision must be made.

Other objectives, advantages and applications of the present invention will be made apparent by the following detailed description of preferred embodiments of the invention. The description makes reference to the accompanying drawings in which:

FIG. 1 is a schematic view of a generalized form of a delayed fraction recording and computing system, embodying the present invention;

FIG. 2 is a view of a first form of chart speed sensor, employing marks on the chart paper;

FIG. 3 is a view of the chart speed sensor of FIG. 2 taken from an orthogonal direction;

FIG. 4 is a perspective illustration of another form of chart speed sensor including a wheel bearing directly on the chart paper;

FIG. 5 is a view of another alternative form of chart speed sensor employing a mechanism connected to the chart drive motor;

FIG. 6 is a schematic block diagram of a memory system employing a random access memory; and FIG. 7 is a schematic diagram of an alternative type of memory employing a digital shift register.

Referring to the drawings, FIG. 1 illustrates a system formed in accordance with the present invention for recording the output of a scanning densitometer on a chart and for computing integrals of various segments of the resulting curve with the segment boundary determined by an automatic detector and then manually edited.

The scanning densitometer 10 may be of the type commercially available to scan a separation produced by electrophoresis of a biological specimen, such as a blood sample. This scanner traverses the sample from one end to the other and provides an electric output signal having an amplitude which varies as a function of the density or other property of the separation. Alternative embodiments of the invention could be provided to record and analyze other time varying electrical signals derived by the analysis of other physical specimens.

In the preferred embodiment of the invention the output of the scanning densitometer, on line 12, constitutes an analog voltage having an instantaneous amplitude varying as a function of the physical property of the point on the separation or other record being instantaneously scanned. This signal is provided to a pen drive motor 14 operative to position a recording pen 16 across the width of a chart paper 18. The chart paper 18 is moved by a chart drive 20 and the time varying signal provided to the pen drive motor 14 causes the recording pen 16 to write a visually readable trace 22 on the chart representative of the varying instantaneous value of the densitometer signal on line 12. The chart drive 20 may be started and stopped and its speed adjusted by a manual control device 21.

The output of the densitometer on line 12 is also provided to an automatic boundary decision circuit 24 operative to detect reversals in the sign of the derivative of the densitometer signal from a negative to a positive value. The circuit may be of the type disclosed in U.S. Pat. No. 3,784,789. These boundary determinations are provided to the recording pen 16 causing it to form boundary decision blips 28 on the trace 22. These boundary decision blips 28 are intended as approximations of the boundaries between segments on the curve representing separate biological entities. For example, when the densitometer is scanning an electrophoresis separation the boundaries may divide segments related to the various proteins in a blood sample.

The output of the scanning densitometer on line 12 is also provided to a analog to digital converter 30 which continually generates the digitized value of the scanner output signal or signals cumulatively representative of its integral. For example this unit may constitute a voltage to pulse converter that outputs pulses at rate proportional to its input voltage. These digitized signals are provided to a digital memory 32. The boundary decisions in boundary decision circuit 24 are also stored in the digital memory 32.

A cursor assembly 34 having a central hairline 36 extends across the width of the chart paper 18 at a distance spaced from the recording pen 16 sufficiently so that an operator can observe the trace 22 and the boundary decision blips 28 after they are generated and before they pass under the cursor assembly 34. A manual fraction edit circuit 38 allows an operator to generate signals which can modify the boundary decision generated by the boundary decision circuit 24 by either deleting previously determined boundaries or adding others. The manual fraction edit circuit 38 provides output signals to a pen control circuit 39, which also receives the automatic boundary signals from the digital memory 32, and provides an output to an edit pen 40 which prints all the net boundary decisions, as marks 42, on the bottom of the chart paper 18.

The outputs of the manual fraction edit circuit 38 are provided to an integral computer 44 which also receives signals representative of previously stored trace amplitude and automatic, unedited boundary decisions from the digital memory 32. As a particular point on the trace 22 passes beneath the central hairline 36 of the cursor, the digital memory 32 provides the integral computer 44 with a signal representative of the amplitude of that point on the trace, or its integral, and any boundary decisions which were generated by the boundary decision circuit 24 relative to that point.

In the preferred embodiment of the invention this synchronism is achieved by a memory control circuit 46 which receives pulses from a chart speed sensor 48. The chart speed sensor 48 is illustrated as being coupled to the chart drive 20 but this relationship may be unnecessary in alternative embodiments of the invention.

The digital memory 32 may take the form of a random access memory of the semi-conductor, bubble, or core type, or the like, or may alternatively constitute a digital shift register. In either event the memory control circuit 46 operates to insure that signals from the analog-to-digital converter 30 and the boundary decision circuit 24 are stored as a point on the recording trace 22 as written by the pen 16, and that those signals are provided to the integral computer 44 when the point passes under the hairline of the cursor. Thus the trace amplitude and boundary detection signals are provided to the computer on a first-in, first-out basis and the period of storage of signals in the memory is determined by the rate of motion of the chart.

The integral computer 44 also receives signals from the manual fraction edit circuit 38. The delete signals from the edit circuit 38 are provided substantially simultaneously with the provision of the automatic boundary decisions from the digital memory 32. The integral computer 44 acts to compute or sum the integral of the curve segment denominated by the automatically determined boundaries as modified by the manual fraction edit circuit 38.

The output of the integral computer 44 is fed to a printer 50 or other suitable display mechanism. The printer 50 may be associated with the cursor assembly 34 so as to imprint directly on the chart paper. This would allow the numerical value of the integral of the curve fraction to be imprinted directly on that curve.

Since the rate of operation of the entire system is dependent upon the rate of motion of the chart paper, the chart speed may be manually adjusted with the manual control device 21 to suit the convenience of the operator, or the chart may be stopped at any point to allow the operator to examine a particular section of the curve before making a boundary decision. The chart drive motor may be relatively low in cost and the system may be easily added to an existing chart recorder without modifying the chart drive system.

FIGS. 2 through 5 illustrate three alternative forms of chart speed sensors which might be employed with the board inventive system illustrated in FIG. 1. FIGS. 2 and 3 illustrate the form of chart speed sensor which requires use of a chart paper 60 having pre-printed lines 62 formed at regular intervals along one of its edges. The pre-printed lines 62 are preferably visible markings, which effectively modify the optical transmissive density of the chart paper. The passage of these marks are sensed by a photodetector 64 positioned adjacent the imprinted edge of the chart paper on the opposite side of the chart paper from a light source 66. The amplitude of the output of the photodetector shifts level as one of the pre-printed lines 62 passes between the photodetector 64 and the light source 66 and provides an output pulse to the memory control circuit 46. These pulses are used to time the storage of signals within the digital memory 32.

Alternatively, the pre-printed lines 62 might be magnetic strips sensed by a suitable magnetic pick-up.

An advantage of this system is that different delays may be provided by simply using chart paper having a different spacing between the marks and repositioning the cursor.

FIG. 4 illustrates an alternative form of chart speed sensor employing a rotary pulse generator 68 having a resilient wheel 70, formed of rubber or a like material, connected to its shaft. The resilient wheel 70 bears against one edge of the chart paper and a back-up wheel 72 on the opposite side of the paper, formed of the same resilient material, provides a bearing surface. The resilient wheel 70 rotates as the chart paper 74 is moved producing rotation of the shaft of the rotary pulse generator 68 and the generation of pulses in timed relation to the chart speed.

In the embodiment of FIG. 5 a rotary pulse generator 76 is connected to the shaft 78 that drives the chart paper. The shaft 78 is powered by a conventional motor 80.

While the three embodiments illustrated all generate pulses, alternative forms of this system could embody signals representative of the speed of the chart paper in different forms of encoding, such as phase shifted signals or the like.

FIGS. 6 and 7 illustrate alternative forms of memory and memory control systems for use with the present invention as broadly illustrated in FIG. 1. In the system of FIG. 6, the digital memory 32 takes the form of a random access addressable memory which is preferably of the semi-conductor variety. A memory buffer 90 is connected to the memory 32a by a number of parallel lines, has input lines from the analog-to-digital converter 30 and the boundary decision circuit 24 and provides output lines to the integral computer 44. The memory buffer 90 may either provide information from the analog-to-digital converter 30 and 24 to the memory boundary decision circuit 34 or provide information from the digital memory 32a to the integral computer 44. Its mode of operation is controlled by an input-output control circuit 92 which alternately switches the buffer between its input and output modes.

The input-output control circuit 92 also connects to a memory address control 94 which determines the cells of digital memory 32a which are connected to the memory buffer 90. Accordingly, as the input-output control circuit 92 switches, it allows information from analog-to-digital 30 and boundary decision circuit 24 to be provided to one memory location and then outputs information to the computer from a different memory location.

The input and output memory locations are controlled by input and output address registers 96 and 98 respectively. Both of these registers provide lines indicative of their status to the memory address control 94. The address registers 96 and 98 are incremented by signals from the chart speed sensor 48. Each time an additional pulse is provided from the chart speed sensor 48, the contents of each of the registers is increased by one, when the registers reach their maximum count, they revert to zero. The contents of the address registers 96 and 98 differ from one another at any instant by a factor equal to the number of words stored in the memory. Accordingly, information entered into the memory is stored for the period of time required for the chart speed sensor 48 to generate the number of pulses equal to the number of words stored in the memory before it is outputted. If the pulse rate increases, the storage time is lowered and as pulse rate decreases the storage time increases. This memory system could be implemented using a suitably programmed general purpose computer and the most economical form at the time of this application constitutes a micro-processor.

FIG. 7 illustrates an alternative form of memory 32b, constituting a digital shift register having a number of parallel channels equal to the number of signals to be stored. The inputs to the register are provided from the boundary decision circuit 24 and analog-to-digital converter 30 and output is provided to the integral computer 44. Pulses from the chart speed sensor 48 are provided to the shift input of the register and cause start information to be advanced in timed relation to the motion of the chart paper.

The embodiments of the invention in which an exclusive property or privilege is claimed are defined as follows:

1. In an electronic system including means for forming a visually readable graphic record of a time varying electric signal, a recording device, means for relatively moving a recording medium with respect to said recording device, said recording device including means creating said visually readable record on said recording medium; cursor reference means providing a visual reference point on said graphic record displaced from said recording device along the direction of relative motion of said recording medium and said recording device; a memory receiving and storing values of said time varying signal; signal processing means processing said stored time varying signal values after a delay corresponding to said time required for motion of said recording medium from said recording device to said cursor reference means reference point; the improvement comprising: synchronizing means for synchronizing the processing of said stored time varying signal values with the movement of the graphic record of said values to said reference point, said means including means generating a control signal corresponding to the relative movement of said recording medium and also including means causing execution of said processing of said stored signal values upon generation of the control signal corresponding to movement of said graphic record corresponding to said stored signal values to said reference point.

2. The system of claim 1 wherein the contents of the memory are processed on a first-in, first-out basis.

3. The system of claim 1 wherein said recording medium comprises a chart moved with respect to said recording device and said means for generating a control signal includes means for sensing the rate of motion of the chart relative to the recording device.

4. The system of claim 3 wherein said means for sensing the rate of motion of the chart relative to the recording device includes markings formed at regularly spaced intervals on the chart and a sensor head supported in a stationary manner relative to the chart and operative to sense the marks.

5. The system of claim 3 wherein the means for sensing the motion of the chart relative to the recording device includes a drive system for the chart and means for sensing the rate of operation of the drive system.

6. The system of claim 1 including manually actuated means for controlling said signal processing means.

7. The electronic system of claim 1 further including means for controlling the period of time between the entry of the time varying signal into the memory and including a pair of memory address registers and means modifying the contents of said register by said control signal.

8. The electronic system of claim 7 wherein said control signal generated by said synchronizing means has a characteristic which is a function of the graphic recording rate and comprises a pulse stream having a frequency which is a function of the graphic recording rate and said means for controlling the period of time between the entry of the time varying signal into the memory includes means for incrementing the contents of said memory address registers each time a pulse occurs in said control signal.

9. The electronic system of claim 1 wherein said memory constitutes a digital shift register and further includes means for receiving said control signal and for controlling the period of time between the entry of the time varying signal into the memory in accordance therewith and including means for shifting the contents of the register in timed relationship to the occurrence of a characteristic in the control signal.

10. The electronic system of claim 9 wherein said control signal has a characteristic which is a function of the graphic recording rate comprising a pulse train having a pulse rate which is a function of the graphic recording rate, and including means for shifting the contents of the shift register each time a pulse occurs in said control signal.

11. The electronic control system of claim 4 wherein said sensor head for the markings comprises an optical sensor.

12. The electronic system of claim 4 wherein the markings are magnetic and sensor head comprises a magnetic sensor.

13. The control system of claim 3 wherein said means for sensing the rate of operation of the graphic recorder comprises a signal transmitter powered by the motion of the chart.

14. The electronic control system of claim 3 including a drive motor for the chart and a signal transmitter connected to the drive motor to generate a signal proportional to the rate of operation of the graphic recording means.

* * * * *

UNITED STATES PATENT AND TRADEMARK OFFICE
CERTIFICATE OF CORRECTION

PATENT NO. : 4,267,574
DATED : 5-12-81
INVENTOR(S) : Jan A. Vanden Broek

It is certified that error appears in the above-identified patent and that said Letters Patent are hereby corrected as shown below:

Column 5, line 28 "recording trace" should be --trace--.

Column 5, line 29 "pen" should be --recording pen--.

Column 6, line 48 "24" should be --boundary decision circuit 24--.

Column 6, lines 48-49, delete "memory boundary decision circuit 34" and insert --digital memory 32a--.

Column 6, line 59, after "digital" should be --converter--.

Signed and Sealed this

Eighth Day of September 1981

[SEAL]

*Attest:*

GERALD J. MOSSINGHOFF

*Attesting Officer*  *Commissioner of Patents and Trademarks*